June 4, 1935. R. E. PETRIE 2,003,389
LUBRICATING SYSTEM AND METHOD OF INSTALLING THE SAME
Filed March 14, 1931   2 Sheets-Sheet 1
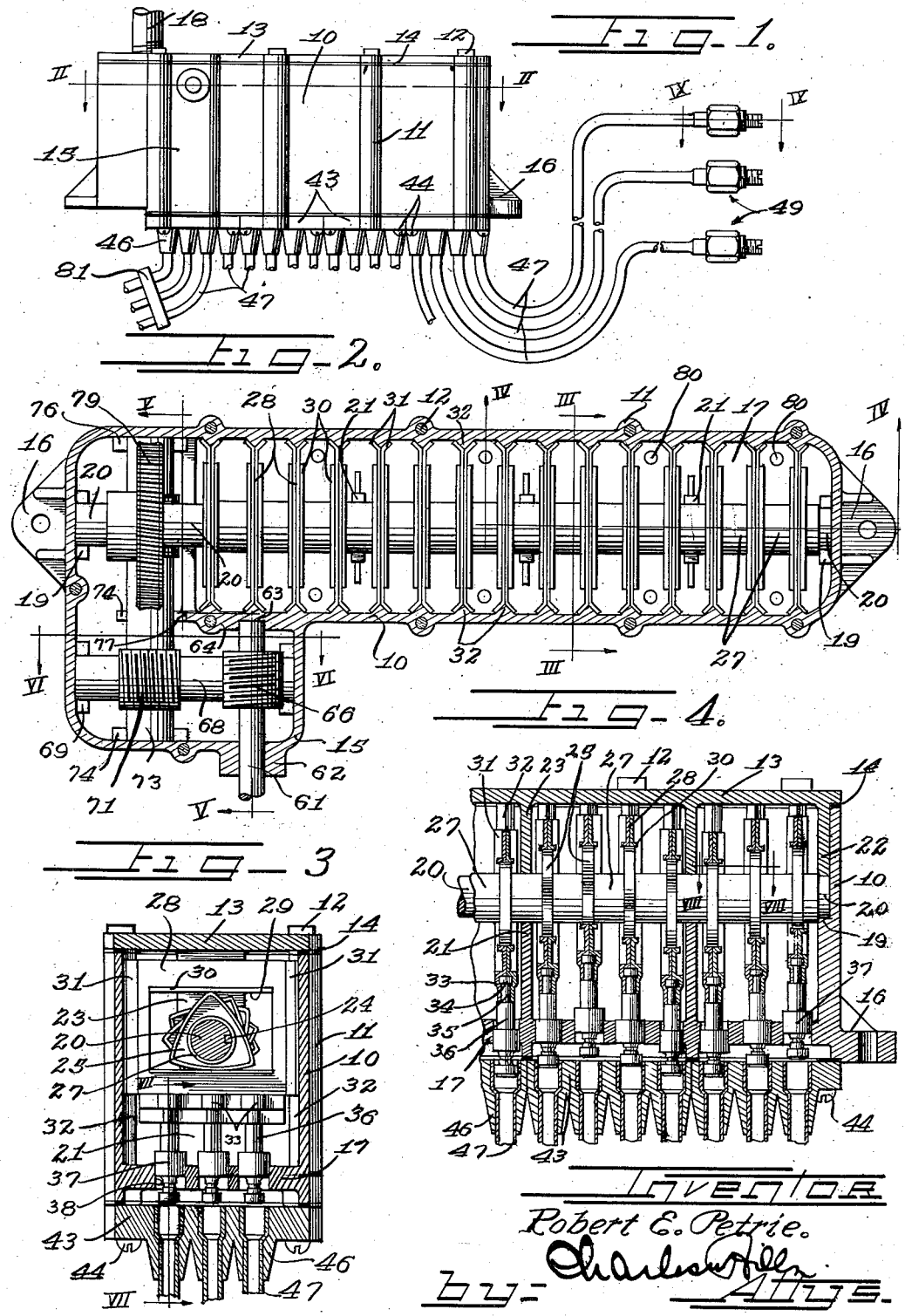

June 4, 1935.　　　R. E. PETRIE　　　2,003,389
LUBRICATING SYSTEM AND METHOD OF INSTALLING THE SAME
Filed March 14, 1931　　2 Sheets-Sheet 2
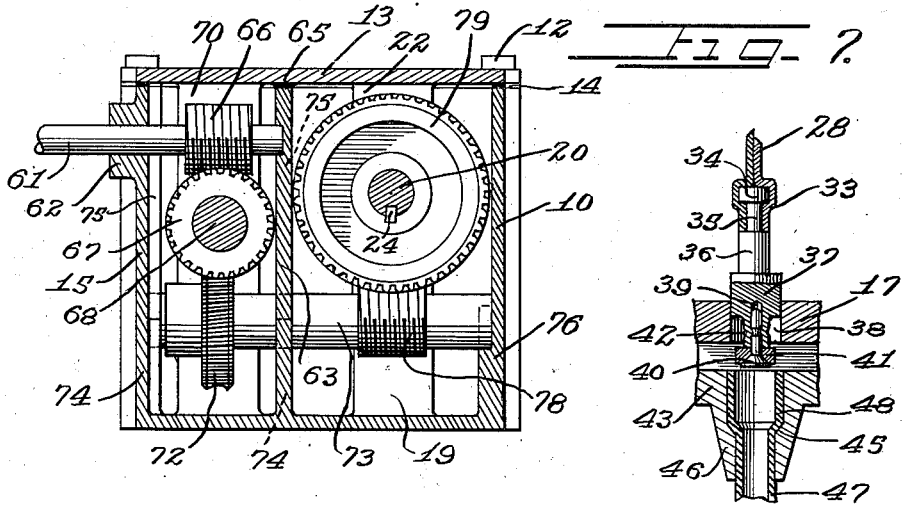
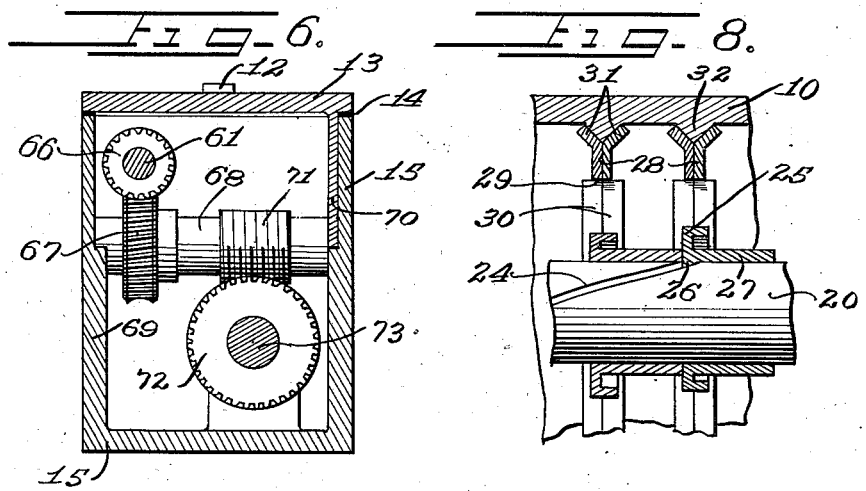
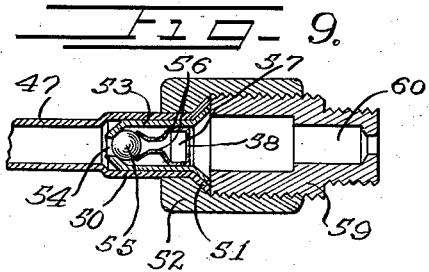
Inventor
Robert E. Petrie.
by
Attys.

Patented June 4, 1935

2,003,389

UNITED STATES PATENT OFFICE 2,003,389

LUBRICATING SYSTEM AND METHOD OF INSTALLING THE SAME

Robert E. Petrie, Chicago, Ill.

Application March 14, 1931, Serial No. 522,664

17 Claims. (Cl. 184—27)

This invention relates to a lubricating system for supplying measured quantities of lubricant to a plurality of locations, and more particularly to a lubricating system capable of efficiently and automatically lubricating a number of bearing points wherein each bearing point or the like receives a measured and timed delivery of lubricant separately from the other bearing points, although the invention will have many and various uses and purposes as will be apparent to one skilled in the art.

In the past, many and various systems of lubrication for automobiles and numerous other mechanisms have been developed, but have, in most instances, due to inherent structural characteristics, proven objectionable. For example, there was the original oil can system, where each bearing point in the mechanism was lubricated by means of an oil can in the hands of an operator who must of necessity, for the proper functioning of the mechanism, individually apply oil to each bearing point. There was also the grease-gun system wherein a grease gun was used to apply lubricant at each bearing point. Obviously, in connection with most mechanisms and especially so with an automotive vehicle, such systems were highly objectionable due to the time and labor expended in lubricating the apparatus. Later, in the development of the automobile, a lubricating system was devised whereby, by the depression of a pedal or equivalent means, lubricant was moved toward each or the most important bearing points. However, with such a system, in the event the lubricant line or lines would become plugged adjacent a bearing point, the lubricant might be supplied to various other bearing points, but would never reach the ones nearest the defect in the line. Consequently, it was a mere matter of time before considerable points in need of lubricant would lack an adequate supply, with the resultant injury to the mechanism. The same objections apply to a later developed system on the same order of the above mentioned system, but supplying the lubricant by means actuated by the vehicle engine. Still another system formerly employed for the lubricating of automotive vehicles was the so-called "Jiggle" system, wherein a plunger or piston disposed above a quantity of lubricant was bounced up and down by the jarring of the vehicle and was so intended to force lubricant to the bearing points. The inadequacy of such a system is obvious. In short, all previously known lubricating systems of which I am aware, failed to eliminate the labor necessary to individually lubricate each bearing point by hand and at the same time provide positive lubrication at each and every point.

The present invention has been designed to overcome the above noted as well as other defects and objections in the provision of an improved self-operating lubricating system for supplying measured charges of lubricant to selected points requiring lubrication at predetermined time intervals in a positive manner.

It is also an object of this invention to provide an improved automatic lubricating system which positively and individually lubricates each bearing point of a mechanism.

It is also an object of this invention to provide an improved permanent displacement lubricating system which feeds separate measured charges to a plurality of points to be lubricated.

A further object of this invention is the provision of a lubricating system having a plurality of means each of which forces lubricant to an individual bearing point, the means being subjected to sequential operation whereby there is a uniform distribution of operating loads during the cycle of operation.

A still further object of the present invention is the provision of a lubricating system embodying a mechanism designated to permanently displace lubricant from a reservoir into an individual conduit for each bearing point, the operating mechanism being entirely free from threaded connections.

It is still another object of the present invention to provide a lubricating mechanism which positively and individually forces lubricant to a plurality of points in need thereof at timed intervals and in quantities corresponding to the amount of lubricant which may be substantially used by the time the next charge is delivered.

It is another object of this invention to provide a lubricating system which automatically lubricates each bearing point of an apparatus with a certain definite amount of lubricant regardless of whether or not the number of points to be lubricated may unintentionally vary from time to time.

Still another object of this invention is the provision of a lubricating system arranged to automatically and positively lubricate each point in an apparatus in need of lubricant, and arranged in such a manner that a glance is sufficient to ascertain if there is a failure of lubricant supply at any point, and if so, the exact location at which the failure has occurred.

An additional object of this invention is the provision of a lubricating system whereby the bearing points of an apparatus are each provided with an individual supply tube, the supply tubes being arranged in unitary bundles, each bundle supplying a different region of the apparatus and all of the bundles being connected to the same mechanism whereby the lubricant is supplied and forced through the tubes.

A still further object of the invention is the provision of a new and improved method of installing and using a lubricating system.

While some of the more salient features, characteristics and advantages of the present invention have been above pointed out, others will become apparent from the following disclosures.

The invention includes these and other features of construction and combinations of parts hereinafter described and shown in a preferred form in the drawings, as more particularly indicated by the claims.

On the drawings:

Figure 1 is a fragmentary elevational view of a lubricating system embodying the principles of the present invention.

Figure 2 is an enlarged fragmentary plan sectional view of the main operating structure of the system shown in Figure 1, taken substantially as indicated by the line II—II of Figure 1, and with the cover removed.

Figure 3 is a fragmentary vertical sectional view taken substantially as indicated by the line III—III of Figure 2.

Figure 4 is a fragmentary longitudinal vertical sectional view taken substantially as indicated by the line IV—IV of Figure 2.

Figure 5 is a vertical sectional view, with parts in elevation, taken substantially as indicated by the staggered section line V—V of Figure 2.

Figure 6 is a vertical sectional view, with parts in elevation, taken substantially as indicated by the line VI—VI of Figure 2.

Figure 7 is an enlarged fragmentary vertical sectional view of the plunger mechanism taken substantially as indicated by the line VII—VII of Figure 3.

Figure 8 is an enlarged fragmentary plan sectional view taken substantially as indicated by the line VIII—VIII of Figure 4.

Figure 9 is an enlarged fragmentary vertical sectional view through the nozzle on the end of the supply tube and taken substantially as indicated by the line IX—IX of Figure 1.

As shown on the drawings:

In the illustrated embodiment of the present invention, there is shown a casing 10 having spaced bosses 11 on the sides thereof, each boss containing a threaded aperture to accommodate the shank of a bolt 12 by means of which bolts a cover 13 is securely held upon the casing, there being a suitable liquid tight gasket 14 between the casing and cover. With reference to Figure 2, it will be seen that the casing is provided with an integral offset portion 15 having its own bottom and which, together with the adjacent end of the main portion of the casing, functions as a gear box, the contents of which will be later described herein. The cover is likewise shaped so that one cover is sufficient for the entire casing top. At each end of the longer or main portion of the casing, an integral bracket 16 is provided by means of which the device may be mounted in any suitable location. The casing 10, preferably a die-cast casing, is provided in the longer portion thereof with an integral false bottom 17 extending substantially to the gear-box region, and is designed to function as a lubricant reservoir or container, the casing either carrying the full charge of lubricant or being fed from a supply pipe 18 entering through the cover 13 (Fig. 1).

Each end of the longer portion of the casing 10 is provided with an integral bearing seat 19 which may be lined with any suitable bearing material, if so desired, and which bearing seats receive opposite ends of a main shaft 20. At spaced intervals along the false bottom 17 other integral bearing seats 21 extend upwardly therefrom so that the shaft 20 will be supported properly throughout its length. The cover 13 is also provided with downwardly extending integral bearing seats 22 at each end thereof to coincide with the bearing seats 19 of the casing, and with bearing seats 23 spaced along the longer portion of the cover to coincide with bearing seats 21.

The main shaft 20 has a spiral groove 24 therein (Fig. 8) and cams 25 each carrying an integral detent or key 26 and an integral spacing washer 27 are strung on the shaft by inserting the key 26 into the groove 24 and allowing the cams to assume their respective positions in accordance with the curvature of the groove. These cams are preferably metal stampings of identical construction, with the single exception of the cam at one end of the row which naturally has a foreshortened spacing washer which abuts the bearing seats 19 and 22 at this end of the casing, and no other means are required for maintaining the cams in their respective fixed positions relative to the shaft 20. Of course, the cams will be out of exact phase with each other due to the curvature of the groove 24, and this groove is so curved that all of the cams would be equally out of exact phase. For example, in the present instance, the groove in the shaft starting at the right hand end of the shaft as the same is seen in Figure 2 should be 24-degrees short of a complete revolution immediately under the last left hand cam, since in the present instance, fifteen cams are shown and consequently they should each be 24-degrees out of exact phase.

Each of the cams 25 is arranged to lower and raise a crosshead 28 designed with a central aperture 29 therein within which the cam is disposed. The crossheads 28 are each preferably formed by uniting a pair of complemental stampings welded or otherwise secured together, and adjacent the aperture 29 the stampings are provided with opposed outward flanges 30 to furnish a proper surface for contact with the respective cam. On opposite sides thereof, the stampings forming each of the crossheads are flared outwardly as at 31 to provide substantially a V-notch for receiving ribs 32 preferably cast integrally with the side walls of the casing 10 when the same is formed. These ribs, of course, act as guides for the reciprocatory movement of the crossheads. In the present instance, since the cams 25 are shown with three maximum points and three minimum points, the crossheads will make three up and down cycles of movement for each revolution of the main shaft 20.

With reference now to Figures 3 and 7, it will be seen that the bottom portion of each crosshead 28 is formed to provide a row of sockets 33, in this instance three sockets, each for the purpose of receiving a head 34 and a neck 35 formed on the upper end of a plunger 36, whereby the plungers are firmly secured to the crossheads. Each of the plungers 36 is provided with an enlarged guide bearing portion 37 received in an aperture 38 in the false bottom 17 of the lower From the foregoing, it is apparent that I have provided a lubricating system which is highly positive in its action insuring an individual supply of lubricant to each of the plurality of bearing points. It is also obvious that the device is exceedingly simple in construction and operation, readily installed and may be very economically manufactured. Further, the system operates under a new and novel installation and use which reduces initial labor and expense and provides more positive results.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a lubricating device, a casing for containing a supply of lubricant and having outlet openings therein, said openings having larger inner portions than outer portions, a delivery tube leading from each of said openings, said tubes being each of a size to substantially fit in the smaller part of the respective opening and having an expanded inner end fitting the inner portion of the opening, and means to force lubricant through said openings into said tubes.

2. In a lubricating mechanism, a casing for containing a lubricant supply and having a plurality of outlets, delivery conduits leading from said outlets, a plurality of crossheads in said casing, guiding means for said crossheads on the side walls of said casing, said crossheads being formed for complemental engagement with said guiding means, means for actuating said crossheads, and means positively connected to said crossheads and responsive to the actuation thereof for forcing lubricant through said conduits.

3. In lubricating means, a casing for containing a supply of lubricant and having a plurality of outlets, delivery tubes leading from said outlets, headed plungers for forcing lubricant through said tubes, crossheads over said plungers, said crossheads being formed of complemental stampings secured together around the heads of said plungers, and means for actuating said crossheads.

4. In means of the character described, a casing for containing a supply of lubricant and having a plurality of outlets, a cover for said casing, means in said casing for forcing lubricant through said outlets, a shaft for driving said means, and bearing seats for said shaft integral with said casing and said cover.

5. In lubricating means, a casing for containing lubricant and having outlets, guide ribs integral with the walls of said casing, crossheads in said casing formed of complemental stampings having opposed ends shaped to fit said guide ribs, means for actuating said crossheads, and means responsive to the movement of said crossheads for forcing lubricant through said outlets.

6. In means of the character described, a casing for containing a supply of lubricant, a false bottom in said casing and provided with a plurality of apertures, a real bottom in said casing spaced below said false bottom to form a chamber fed with lubricant by gravity through certain of said apertures, and said real bottom being provided with a plurality of outlets each in line with one of said apertures, plungers in said casing extending through certain of said apertures to be guided by said false bottom, and means for moving said plungers into and out of said outlets to force lubricant therethrough.

7. In means of the character described, a casing for containing a supply of lubricant and having a plurality of outlets, plungers in said casing positioned to force lubricant through said outlets, a shaft in said casing having a spiral groove therealong, driving means for said shaft, and cams on said shaft for operating said plungers and each having a key thereon seated in said groove, said keys being symmetrically located on said cams, whereby said cams are out of phase and the load on the shaft is equalized.

8. The method of installing a lubricating system having a central mechanism for forcing lubricant through delivery tubes, consisting of mounting said central mechanism in a desired location, attaching a plurality of tubes at their ends to each of a plurality of base plates, bundling the tubes connected to each plate, attaching the other ends of a bundle of tubes to bearing points in a certain region of the apparatus to be lubricated, filling said bundle of tubes with lubricant, connecting the base plate of said bundle to said central mechanism after the filling operation, and doing likewise with the remaining bundles of tubes.

9. In a lubricating mechanism, a casing for containing a supply of lubricant and having an outlet, reciprocatory means in said casing for forcing lubricant through said outlet, means on the side walls of said casing forming guides for said reciprocatory means, and a part of said reciprocatory means being formed to complementally engage said last mentioned means.

10. In a mechanism of the character described, a casing for containing a lubricant supply and having a plurality of outlet conduits, reciprocatory means for forcing lubricant through said conduits, said means being disposed in rows both longitudinally and transversely of said casing, each row including a plurality of said means, parallel crossheads in said casing each engaged with all the reciprocatory means in an entire row in one of said directions, means for reciprocating said crossheads, guide means on the side walls of said casing, and said crossheads being formed on opposite sides for complemental engagement with said guide means.

11. In a mechanism of the character described, a casing for containing a lubricant supply and having an outlet conduit, means for forcing lubricant through said conduit, a crosshead for actuating said means, guide means on the side walls of said casing, said crosshead being formed on opposite sides for complemental engagement with said guide means, means for driving said crosshead, and bearing seats for said last mentioned means formed integral with said casing.

12. In a lubricating mechanism, a casing for containing a supply of lubricant and having a plurality of outlet openings therein, a delivery conduit leading from each of said openings, plungers in said casing in alignment with said openings, a plurality of crosshead means in said casing each connected to a plurality of said plungers for positively moving said plungers both into and out of said openings, each opening being filled with lubricant from said casing by gravity upon the withdrawal of the respective plunger, and each plunger upon its in stroke positively forcing an amount of lubricant through the respective conduit equivalent to the volume of the part of plunger entering the opening.

13. In a lubricating mechanism, a casing for containing a supply of lubricant and having a plurality of outlet openings, a conduit leading from each of said openings, means movable into and out of said openings, said openings filling with lubricant by gravity when said means are withdrawn, and a plurality of driving means for positively forcing the first said means into and out of said openings, each of said driving means being connected to a plurality of the first said means, each first said means exerting pressure directly on the lubricant in the respective opening on the in movement and positively forcing said lubricant through the respective conduit.

14. In a lubricating mechanism, a casing for containing a supply of lubricant and having a plurality of outlet openings, a conduit leading from each of said openings, reciprocatory means for positively forcing lubricant through said conduits, said conduits filling with lubricant from said casing by gravity upon the out strokes of said reciprocating means, and a plurality of driving members for forcibly actuating said reciprocating means, each of said members being operatively associated with a plurality of said reciprocating means, and said members being arranged to successively complete their movements in either direction.

15. In a lubricating system, a lubricant containing casing, a shaft journalled in said casing, cross heads upon said shaft, cooperating means on the ends of said cross heads and casing for guiding the former in rectilinear paths, cams upon said shaft for operating said cross heads, a plurality of plungers operatively connected to each cross head, lubricant delivery tubes attached to the bottom of the casing and having enlarged portions for receiving said plungers.

16. In a lubricating system, a lubricant containing casing, a shaft journalled in said casing, a plurality of cross heads surrounding said shaft, cooperating means upon said casing and the ends of said cross heads for guiding the latter in rectilinear paths, cams upon said shaft for operating said cross heads, a plurality of plungers connected to each cross head, a member attached to the bottom of the casing, said member having apertures with restricted portions, lubricant delivery pipes secured in said apertures and adapted for receiving the lower portions of said plungers.

17. In a lubricating system, a lubricant containing casing, a shaft extending through said casing, cross heads surrounding said shaft, cooperating means upon said casing and the ends of said cross heads for guiding the latter in rectilinear paths, cams upon said shaft for operating said cross heads, a plunger connected to each cross head, means within said casing for guiding said plungers, a member attached to the bottom of the casing and having apertures in alinement with said plungers, said apertures having upper enlargements for receiving said plungers, and lubricant delivery pipes secured in said apertures.

ROBERT E. PETRIE.